Jan. 23, 1923.
R. R. DUPLER.
CULTIVATOR ATTACHMENT.
FILED SEPT. 8, 1921.
1,443,171
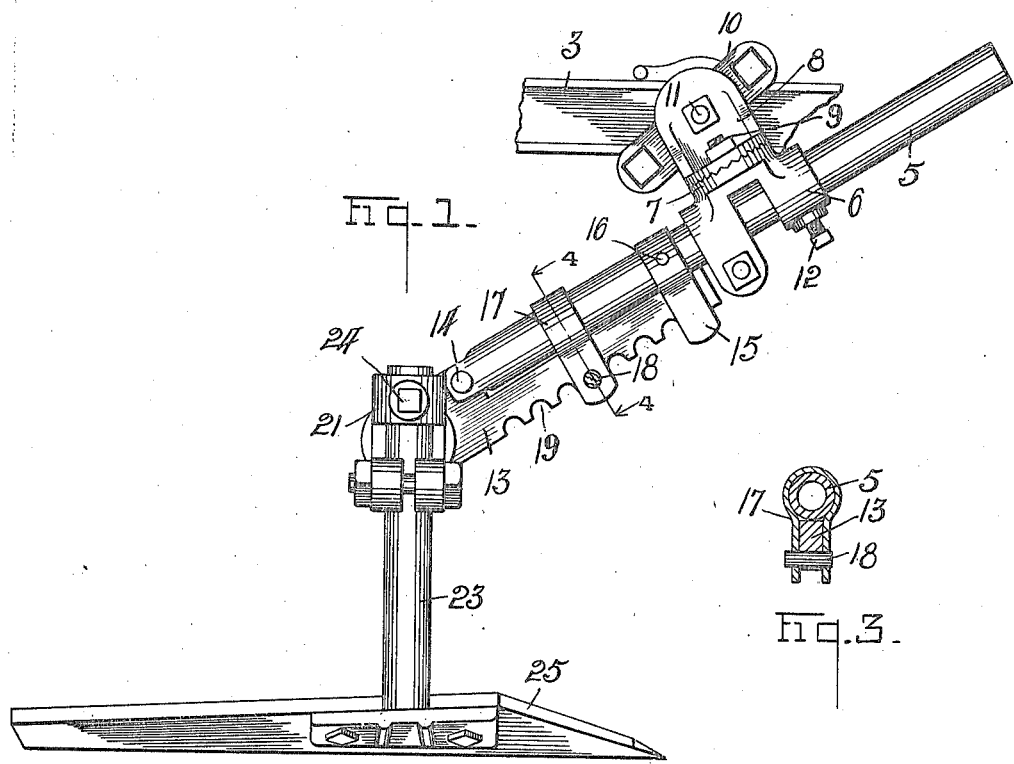
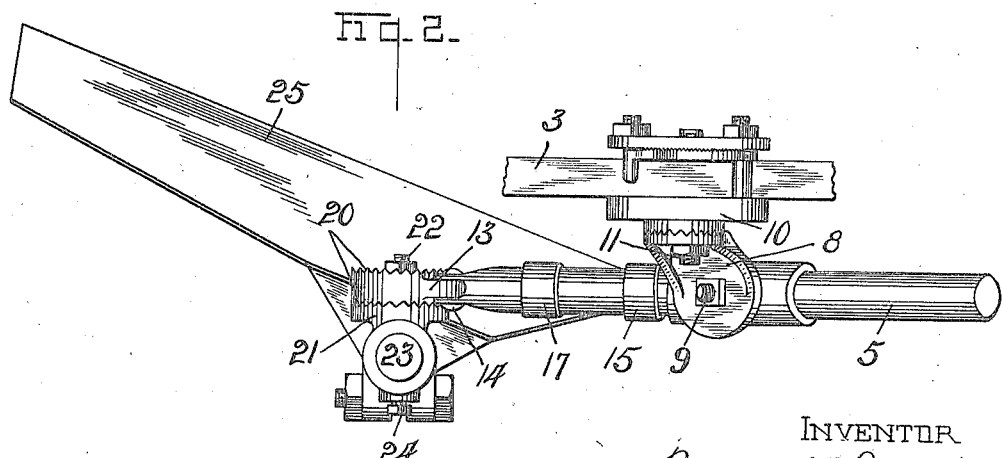
INVENTOR
Raymond R. Dupler,
By Owen Owen & Crampton
Attys.

Patented Jan. 23, 1923.

1,443,171

UNITED STATES PATENT OFFICE.

RAYMOND R. DUPLER, OF TOLEDO, OHIO.

CULTIVATOR ATTACHMENT.

Application filed September 8, 1921. Serial No. 499,249.

*To all whom it may concern:*

Be it known that I, RAYMOND R. DUPLER, a citizen of the United States, and a resident of Toledo, county of Lucas, and State of Ohio, have made an invention appertaining to Cultivator Attachments; and I do hereby declare the following to be a full, clear, and exact description of the invention, such as will enable others skilled in the art to which it appertains to make and use the same, reference being had to the accompanying drawings, and to the characters of reference had thereon, which form a part of this specification.

This invention relates to agricultural implements, and particularly to a carrying attachment for a weed cutting blade or other tool thereof.

An object of my invention is the provision of a simple and efficient attachment of the character described which is capable of universal adjustment in an easy and rapid manner to place the tool carried thereby in different positions.

A further object of my invention is the provision, in an attachment of the class described, of simple and efficient means for rigidly holding the tool in operative position and at the same time permitting it to swing back or move out of such position when encountering a predetermined resistance to its forward movement, such for instance as a root, stump or large stone or its carrying parts.

The invention is fully described in the following specification, and while, in its broader aspect it is capable of embodiment in numerous forms, a preferred embodiment thereof is illustrated in the accompanying drawings, in which.—

Fig. 1 is an enlarged side elevation of the attachment. Fig. 2 is a top view thereof, and Fig. 3 is a section on the line 4—4 in Fig. 1.

Referring to the drawings 3 designates a tool carrying beam of a cultivator having an attachment embodying the invention depending therefrom. This attachment includes a bar 5 which is carried for longitudinal adjustment by a member 6 through which it is projected and which is provided on its top with a circular toothed or serrated part 7. An angled or L-shaped bracket 8 has its horizontally projecting arm provided with a circular serrated surface which is complemental to the serrated surface of the member 6 and adapted to be clamped thereto in any position of circular adjustment by a bolt 9, and the other arm of the bracket has a circular serrated surface adapted to be clamped for rotary adjustment to a complemental surface of a member 10 by a bolt 11. The member 10 comprises one member of a clamp, which is adapted to be rigidly secured to the beam 3 at any desired position of adjustment longitudinally thereof. The bar 5 is secured in adjusted relation to the member 6 by a set-screw 12, or in any other suitable manner. It is evident that the bar 5 may be longitudinally adjusted with respect to the member 6, or may be universally adjusted with respect to the beam 3 by adjusting movements about the respective clamping bolts 9 and 11.

A bar 13 is hinged to the rear end of the bar 5 at 14 for vertical swinging movements relative thereto and has a part adapted to extend forward under the bar 5 in parallel relation thereto. When the bar 13 is substantially in parallel relation to the bar 5 its forward free end is disposed between the legs of a U-shaped guide member 15, which is looped over the bar 5 and fixed thereto by a pin 16 or in any other suitable manner. The guide 15 is open at its lower end to permit the bar 13 to swing downward and outward therefrom. A clip or looped member 17 is slidingly mounted on the bar 5 between the guide member 15 and pivot 14 and has its legs disposed at opposite sides of the bar 13 and provided with apertures through which a pin 18 of wood or other fragile material may be inserted to engage the lower edge of the bar 13 and normally prevent a downward swinging of the bar. The lower edge of the bar 13 is provided with successive notches 19, with any one of which the pin 18 may be engaged depending on the position of adjustment of the clip 17 relative to the bars 5 and 13. It is evident that the nearer the pin 18 is disposed to the free or forward end of the bar 13 the greater will be the stress required on the outer or rear end of the bar to effect a breaking of the pin and a swinging of the bar outward from the bar 5.

The outer or rear end of the bar 13 has a circular serrated surface 20 at one or both sides thereof to which a head 21, having a complementary surface, may be clamped by a pivot bolt 22, thereby facilitating a rotary adjustment of the head in any position with respect to the bar 13. A stem or rod 23 is adjustably mounted in sockets provided in the head 21 at right angles to its adjusting axis, the stem being secured in adjusted position therein by a set-screw 24, or in any other suitable manner. The stem 23 at its lower end carries a tool, which, in the present instance, comprises a weed cutting blade 25.

It is evident in the use of my attachment that the tool 25 is capable of varied and universal adjustment by reason of the mounting of its stem 23 in the rotatably adjustable head 21 for longitudinal adjustment therein and the mounting of the bar 5 on the beam 3 both for longitudinal adjustment in the member 6 and for universal rotary adjustment with respect to the beam 3 through the medium of the angled bracket 8. It is also evident that if the blade 25 in its forward movement encounters a considerable resistance the leverage which is thereby brought to bear on the stem 23 and bar 13, which together form an angled lever, will cause a shearing or breaking off of the pin 18 and permit a rearward swinging of the blade and attached parts, thereby preventing a breaking of any of the permanent parts of the attachment.

I wish it understood that my invention is not limited to any specific construction, arrangement or form of the parts, as it is capable of embodiment in numerous forms without departing from the spirit of the claims.

Having thus described my invention, what I claim as new and desire to secure by Letters Patent, is,—

1. In a tool attachment for cultivators or the like, a bar, a lever member pivoted to the bar and having an arm adapted to extend lengthwise thereof, and a tool carrying arm, a clip carried by the bar, and a breakable member carried by the clip and engaging the adjacent arm of the lever to normally hold the lever in one position relative to the bar, the clip and member being adjustable lengthwise of the bar to vary the position thereof relative to the lever member fulcrum.

2. In a tool attachment for cultivators or the like, a bar, an angled lever pivoted to the bar and having an arm adapted to extend lengthwise of the bar and provided with a plurality of successive notches in its bottom edge, a tool carried by the other arm of the lever, a member fixedly carried by the bar for guiding the swinging movements of the lever relative to the bar, a clip straddling the bar and notched arm of the lever for adjustment longitudinally thereof, and a breakable pin carried by the clip for engaging within any notch of the lever arm to resist a swinging of the lever arm away from the bar and to break when a predetermined swinging stress is applied to the lever.

3. In a machine of the class described, a beam, a bar, means connecting the bar and beam for relative universal adjustment, a tool carrying lever pivoted to the bar for swinging movements relative thereto and having an arm projecting lengthwise of the bar, and means adjustably carried by the bar and having breakable engagement with an arm of the lever to resist a swinging movement of the lever until a predetermined swinging stress is applied thereto.

4. In a machine of the class described, a beam, a bar, means connecting the beam and bar for relative universal adjustment, a second bar pivoted to the end of the first bar and adapted to extend lengthwise thereof, means connecting the two bars to normally retain them in substantially parallel relation and adjustable to vary the stress required to break the said means and permit a relative pivotal movement of the bars, a head carried by the outer end of the second bar for rotary adjustment relative thereto, and a tool carrying stem carried by the head.

In testimony whereof, I have hereunto signed my name to this specification.

RAYMOND R. DUPLER.